United States Patent [19]

Hubl et al.

[11] 4,026,396
[45] May 31, 1977

[54] CONTROL DEVICE FOR FORWARD-REVERSE TRANSMISSION GEARS

[75] Inventors: Julius Hubl; Franz Parzl, both of Munich, Germany

[73] Assignee: Carl Hurth, Maschinen- und Zahnradfabrik, Munich, Germany

[22] Filed: Sept. 13, 1974

[21] Appl. No.: 505,838

[30] Foreign Application Priority Data

Sept. 19, 1973 Germany .......................... 2347043

[52] U.S. Cl. .......................... 192/4 A; 137/614.17; 137/637.4
[51] Int. Cl.² ......................................... B60K 29/02
[58] Field of Search ............ 192/87.18, 87.19, 4 C, 192/109 F, 4 A; 137/614.17, 637.4

[56] References Cited

UNITED STATES PATENTS

| | | | |
|---|---|---|---|
| 2,700,985 | 2/1955 | Gleasman | 137/614.17 X |
| 3,007,347 | 11/1961 | Gendron et al. | 192/109 F |
| 3,042,165 | 7/1962 | Yokel | 192/109 F |
| 3,143,127 | 8/1964 | Frost | 192/4 C |
| 3,213,888 | 10/1965 | Cameron et al. | 137/637.4 |
| 3,613,844 | 10/1971 | Asano et al. | 192/4 C |
| 3,752,281 | 8/1973 | Arnold | 192/87.19 |
| 3,823,801 | 7/1974 | Arnold | 192/109 F |
| 3,850,273 | 11/1974 | Murakami | 192/109 F |

*Primary Examiner*—Benjamin W. Wyche
*Attorney, Agent, or Firm*—Woodhams, Blanchard and Flynn

[57] ABSTRACT

Pressure fluid control for a transmission. There is provided a pressure fluid control device for a transmission, particularly applicable to use in fork lift trucks, wherein a suitable hydraulic selector receives pressure medium from a pressure creating device such as a pump and directs same through a pressure regulating valve to a selected one of the transmission clutches or couplings. Particularly the pressure regulating valve is arranged in a rotary slide valve of the hydraulic selector and is arranged to respond to a piston energized by brake pressure fluid. Thus by the use of very simple apparatus the first portion of a brake pedal movement is utilized to disengage a transmission.

3 Claims, 7 Drawing Figures

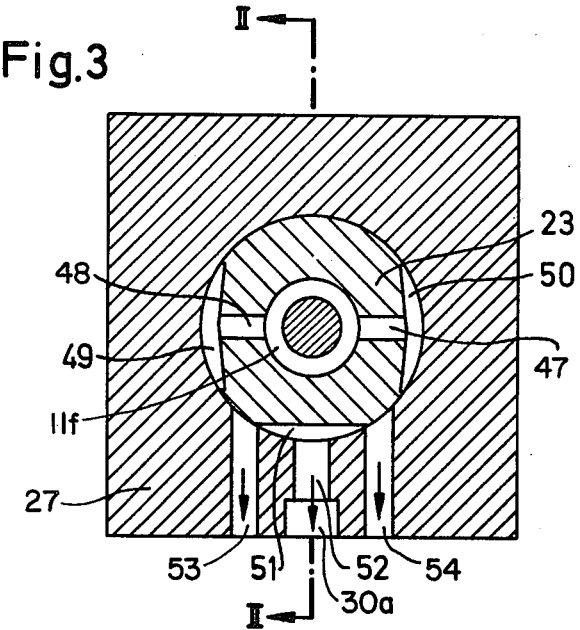
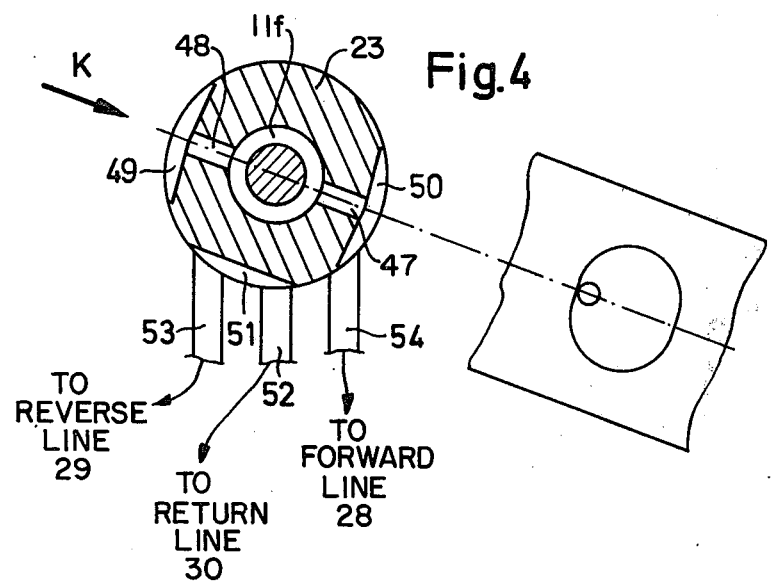

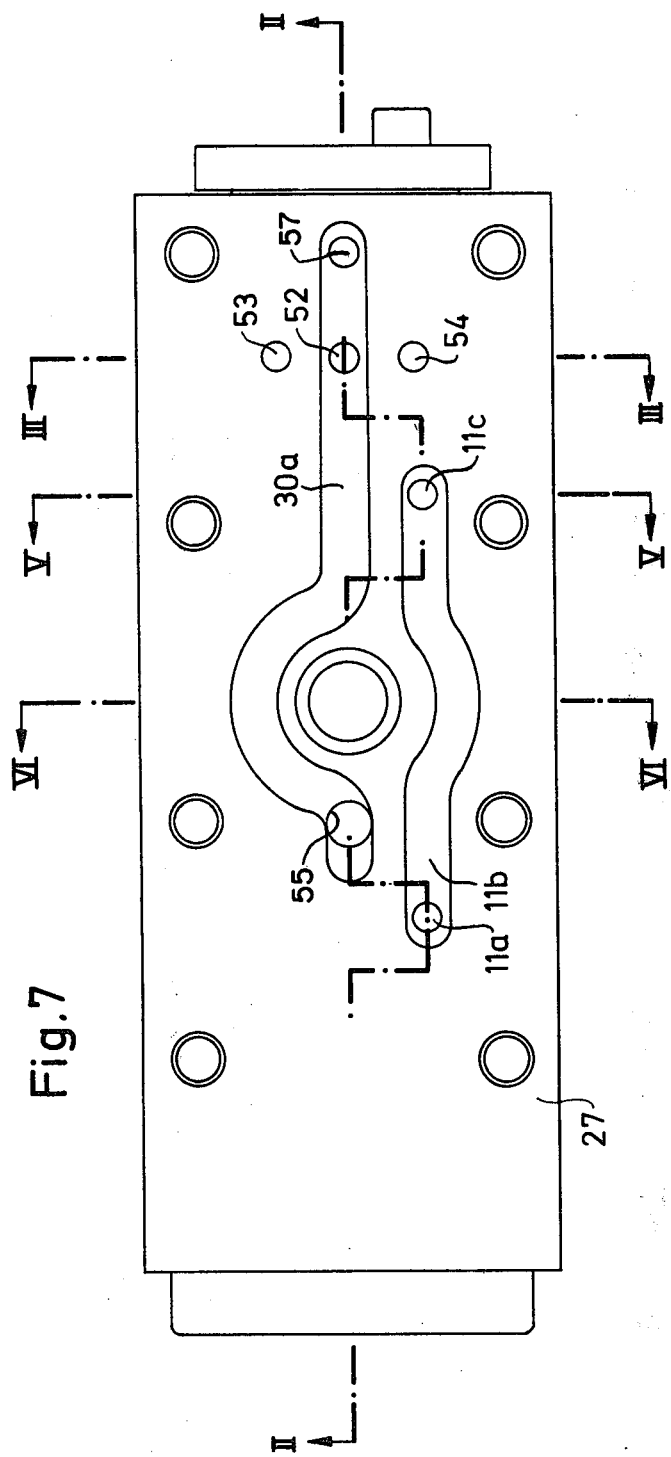

CONTROL DEVICE FOR FORWARD-REVERSE TRANSMISSION GEARS

FIELD OF THE INVENTION

The invention relates to an apparatus, for controlling a vehicle transmission particulary hydraulically controlled fork lifts wherein such apparatus receives a pressure medium from a suitable pressure source and distributes same to the several pressure receiving devices through a pressure regulating valve which is arranged in a rotary slide valve of a hydraulic selector.

BACKGROUND OF THE INVENTION

The basic purpose of the invention is to produce an apparatus in which the control elements are arranged in a compact and close construction in order to occupy only a small space and to facilitate both installation and service.

The basic purpose of the invention is attained by the controlling of a vehicle transmission particularly hydraulically controlled fork lifts wherein such apparatus receives a pressure medium from a suitable pressure source and distributes same to the several pressure receiving devices through a pressure regulating valve which is arranged in a rotary slide valve of a hydraulic selector. If the engagement and disengagement with the brake pedal is controlled by means of the brake pressure fluid, then the invention is advantageously further developed by providing that the spool of the pressure regulating valve projects, directly or by means of an axially extending pin, in an axial direction from the reversing switch and is actuated by pressure means responsive to the brake pressure fluid. An optimum attainment of the above-stated purpose can be realized by placing a filter between the pressure source and the pressure regulating valve.

Aside from attaining the above mentioned purpose, the invention has the advantage that onely very few conduits must be installed, which also reduces sealing problems.

Further advantages and characteristics of the invention result from the following descripiton.

BRIEF DESCRIPTION OF THE DRAWINGS

The invention is discussed in connection with one exemplary embodiment, which is illustrated in FIGS. 1 to 7.

FIG. 3 is a cross-sectional view along the line III—III of FIG. 2.

FIG. 4 schematically illustrates the rotary slide valve of the hydraulic switch in a selected position.

FIG. 7 is a front view in the direction M of the hydraulic selector according to FIG. 2, without its cover.

DETAILED DESCRIPTION

Figure 1:
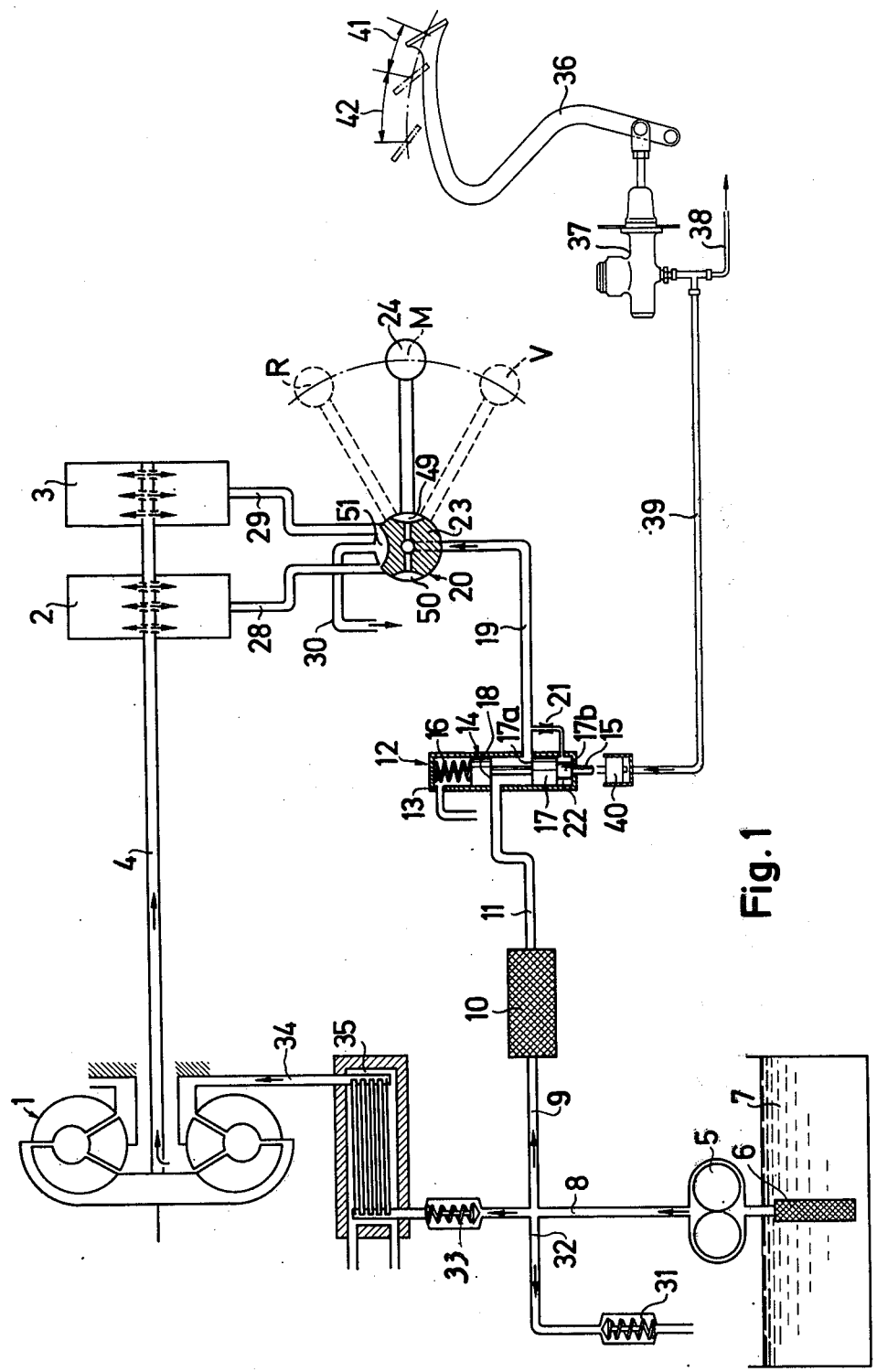
FIG. 1 illustrates a circuit diagram of an apparatus according to the invention.

FIG. 1 illustrates a hydraulic selector mechanism of a drive unit for a fork lift. The drive unit consists substantially of a hydrodynamic converter 1 and a toothed gearing assembly which is connected following said converter and which provides successive upward and downward ratio steps. Of this toothed gearing there are shown schematically only the ratio selecting couplings and not the gears, namely reference numeral 2 identifies the forward coupling and reference numeral 3 identifies the reverse coupling. Between the converter and the gearing, in particular the couplings, there is arranged a lubricant piping 4 which is used for the lubrication.

The pump 5 draws the pressure medium, as oil, through a strainer 6 or filter from an oil reservoir 7 and urges it through lines 8, 9 to a further filter, preferably a fine filter 10, and thence through a connecting line 11 into a pressure regulating valve 12.

The pressure regulating valve 12 consists substantially of a housing 13, the spool 14 which is closely guided therein, and which projects by projecting means, here a pin 15, from the front end of the housing. At the end remote from the pin, the spool is biased by a spring 16. The spool has two pistons, 17, 18, one of which 17 provides a control edge 17a and the other one 18 is used for the additional guiding. A connecting line 19 ends at the control edge 17a, which connecting line 19 connects the pressure regulating valve to a hydraulic selector 20. The connecting line 19 is connected through by-pass line 21 to a chamber 22, which is formed at the end remote from the spring 16 by the spool and the housing. The spool 14 can be moved by the spring 16 until the stop 17b contacts the housing 13. In the circuit diagram of FIG. 1, the connecting channel 19 connects the pressure regulating valve with the inside of the hydraulic selector. In the practical construction, the connecting line 19 and the housing is according to the invention omitted.

The hydraulic selector 20 has a rotary slide valve 23 which can be adjusted by a hand lever 24 or other suitable means as desired. The rotary slide valve can assume three positions, which can be fixed by a locking mechanism, for example a locking ball 26 or the like biased by a spring 25 (see FIG. 3). Two lines extend from the housing 27 of the hydraulic selector to the couplings 2, 3 and can be identified as the forward line 28 and the reverse line 29. On the housing between said lines there is provided a return 30 to the reservoir 7. If the hand lever is in the center position M, the forward reverse lines are connected to the reservoir whereby the pressure medium can be return from the couplings into the reservoir and the couplings are disengaged. In the position V, the forward line 28 receives pressure medium, the forward coupling 2 is energized and the reverse line is connected to the return. In the position R, the reverse coupling receives pressure medium, and the forward coupling is pressure-less.

The pressure in the hydraulic plant is controlled by a relief valve 31, which is connected through a line 32 to the lines 8 or 9 directly to the discharge side of the pump. The hydrodynamic converter is also supplied by the said pump, namely through a pressure holding valve 33 and a line 34. If the vehicle, in the example a fork lift, operates under adverse conditions, a cooler 35 is advantageously provided in the line 34.

If in the pressurized coupling the pressure exceeds a predetermined amount, then the pressure is higher in the chamber 22, the spring 16 is compressed, the control edge 17a closes the flow to the connecting channel 19 or to the coupling. The pressure then drops through leakage areas until the control edge is opened again.

A pedal 36 is provided in the vehicle for coupling and braking, which pedal acts in a conventional manner onto a not illustrated piston, which is guided in a brake cylinder 37. If the pedal is operated, the piston presses brake fluid through the brake line 38 into the brakes. A pressure line 39 branches off from the brake line, through which pressure line a pressure piston 40 which is guided in a cylinder is energized upon operation of the pedal. The pressure piston is arranged in such a manner that it, when energized, acts onto the pin 15 of the spool 14 and cam presses the spring 16. This interrupts the pressure medium feed to the couplings in the first zone 41 of movement of the pedal whereupon the couplings lose pressure through natural leakage points and/or through intentially provided openings to the outside and diengage. Braking takes place as the pedal moves through the further zone 42.

Figure 2:
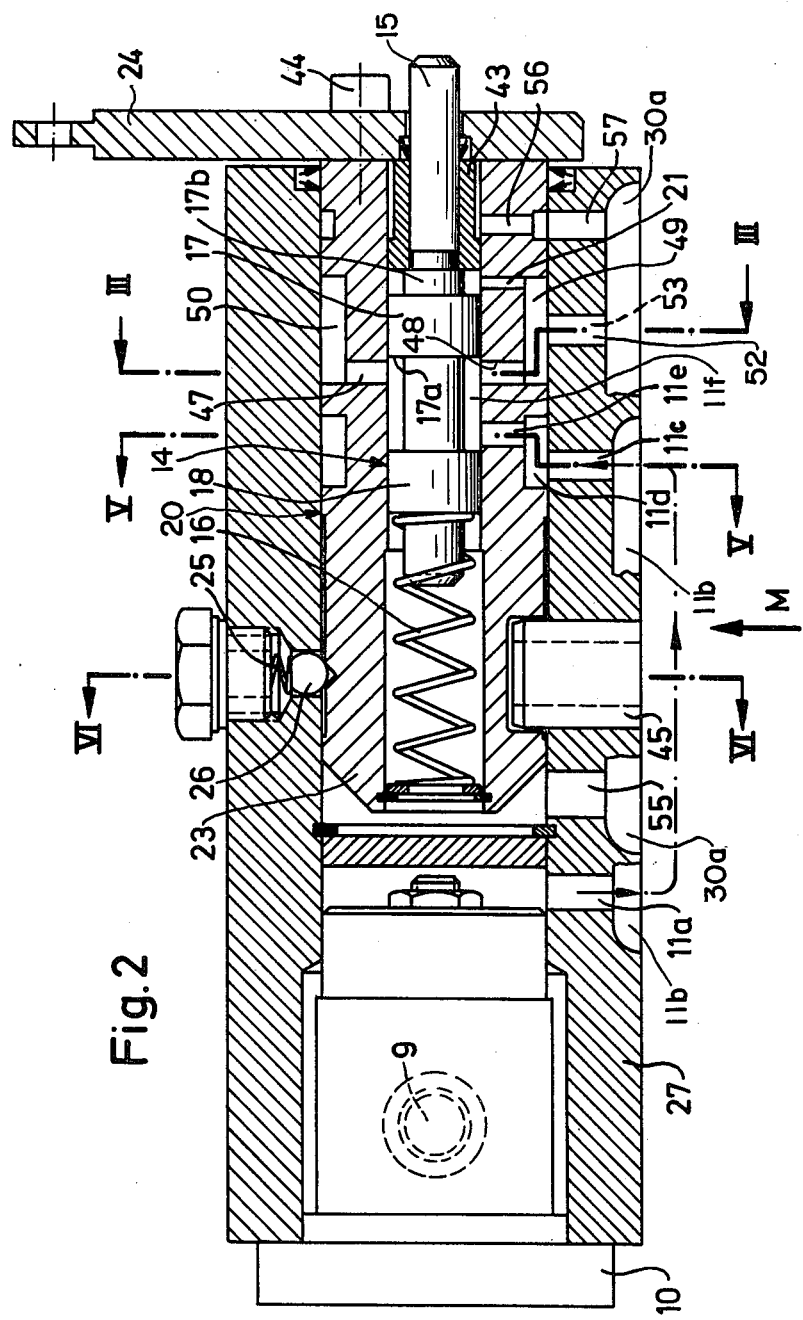
FIG. 2 is a longitudinal cross-sectional view of a control apparatus according to the invention.
Figure 6:
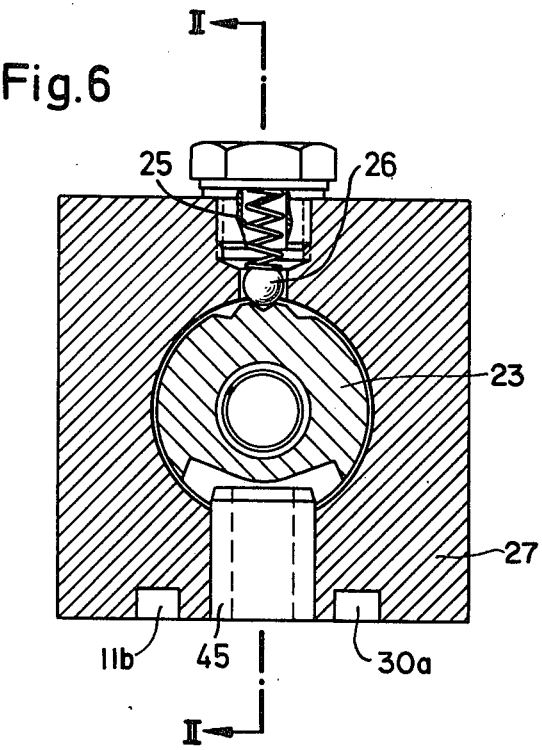
FIG. 6 is a cross-sectional view along the line VI—VI of FIG. 2.

FIG. 2 illustrates the combination of hydraulic slector 20, pressure regulating valve 12 and filter 10. The rotary slide valve 23 of the hydaulic selector is supported rotatably in the housing 27 and is installed in a manner to be sealed at the peripheral parts adjacent the channels or the like. The rotary slide valve can be operated by a hand lever 24 or the like. In an axial bore of the rotary slide valve, the spool of the pressure regulating valve is guided for longitudinal movement and its pistons 17 and 18 are appropriately sealed. This spool is urged by the spring 16, which is supported through a snap ring or the like on the rotary slide valve, in the direction of the hand lever or the like. On the side of the hand lever, the spool is supported by means of the stop 17b through a sleeve 43 agains the hand lever 24, which is secured by screws 44 on the rotary slide valve. The rotary slide valve is held axially with a lock 45 (FIG. 6), so that it can carry out the rotary movement required for shifting.

Axially with respect to the rotary slide valve, the filter 10 is centered and replaceably secured in the housing 27. The pressure medium conduits are provided as bores and channels in the housing and are covered from outside by a not illustrated cover. They will be described hereinafter.

Figure 5:
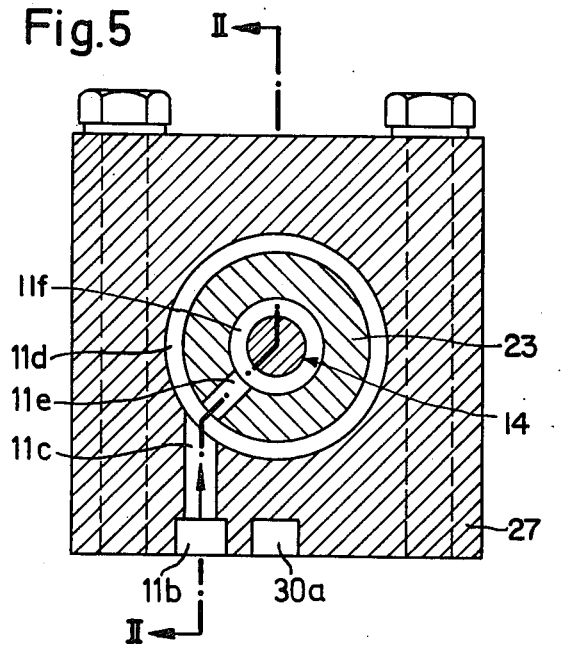
FIG. 5 is a cross-sectional view along the line V—V of FIG. 2.

The pressure medium, as oil, is fed laterally to the filter through line 9, for which purpose a suitable connecting branch is provided on the housing. The oil exits axially from the filter and is fed through connecting lines 11a and connecting channel 11b and connecting bore 11c into an annular chamber 11d (FIG. 5). From said annular chamber there extends a bore 11e to a chamber 11f located between the pistons 17, 18 of the spool 14. Thus the oil is according the invention already inside of the rotary slide valve and the chamber 11f without its requiring in the practical construction a special connecting line 19 (FIG. 1). Within the vicinity of the control edge 17a, the oil enters through bores 47, 48 into chambers 49, 50 (FIG. 3), which are provided on external and opposite sides in the rotary slide valve. A third chamber 51 is positioned between said chambers.

In the center position M (FIGS. 1 and 3), the chambers 49, 50 have no connection to the forward or reverse lines 28, 29, while the third chamber 51 is connected to the return 30 through a bore 52.

If the rotary slide valve is pivoted, for example into the position V (FIGS. 1 and 4), then the chamber 49 remains closed to the outside. The chamber 51 connects the bore 52, that is the return, to the bore 53, which is connected to the reverse line 29; the reverse coupling is thus connected to the reservoir. However, the chamber 50 is connected to a bore 54, to 2 receives pressure oil and is activated. The reverse coupling is operated in corresponding manner.

The bore 52 which is connected to the return 30 ends in a channel 30a (FIG. 7) into which also a relief bore 55 ends, which relieves pressure from the spring-loaded front side of the rotary slide valve. The leakage bores 56, 57 guide the leakage oil exiting at the sleeve 43 into the said channel 30a. The channels 11b and 30a are tightly covered by a not illustrated cover.

The emobidments of the invention in which an exclusive property or privilege is claimed are defined as follows:

1. A control device for controlling transmission means on motorized vehicles having brake actuating means thereon, comprising:
    housing means having a bore therein;
    hollow slide valve means selectively rotatably mounted in said bore and manually operable means at one end of said housing means connected to said hollow slide vlave means for selectively rotating said slide valve means relative to said housing means, said hollow slide valve means including means for preventing a relative axial movement between said slide valve mean and said housing means, said slide valve means having angularly spaced ports thereon;
    first means for connecting said angularly spaced ports to a source of pressure medium;
    first and second passageway means in said housing means for selectively connecting said angularly spaced ports on said slide valve means to said transmission means in response to a rotation of said slide valve means;
    spool means radially inwardly spaced from said angularly spaced ports on said slide valve means and being reciprocally mounted in said hollow slide valve means and having blocking means thereon for blocking the application of pressure medium to said angularly spaced ports in response to a reciprocation of said spool means and, consequently, the application of pressure medium to said first and second passageway means;
    resilient means for urging said spool means to a first position whereat said blocking means is spaced from said angularly spaced ports; and
    pin means projecting outwardly from said housing means at one end thereof for engaging said spool means in response to a brake actuation to effect a moving of said spool means to a second postion against the urging of said resilient means whereat said blocking means blocks said angularly spaced ports in response to an actuation of said brake actuating means said pin means being arranged on the same side of said housing means as said lever means and is encircled by said lever means, said pin means further including a piston having a pin thereon reciprocally mounted in a chamber, said chamber being pressurized in response to said brake actuation, said pin engaging one end of said spool means.

2. A control device according to claim 1, wherein in said housing means there is arranged a filter which is provided in the line between a pressure medium pump and said angularly spaced ports.

3. A control device according to claim 2, wherein said filter and said slide valve means are arranged coaxially in said housing means.

* * * * *

UNITED STATES PATENT AND TRADEMARK OFFICE
CERTIFICATE OF CORRECTION

PATENT NO. : 4 026 396
DATED : May 31, 1977
INVENTOR(S) : Julius Hübl and Franz Parzl It is certified that error appears in the above-identified patent and that said Letters Patent are hereby corrected as shown below:

Change spelling of inventor "Hubl" to ---Hübl---.

Column 4, line 21; change "vlave" to ---valve---.

Column 4, line 25; change "mean" to ---means---.

Column 4, line 50; change "postion" to ---position---.

Column 4, line 54; after first occurrence of "means" insert ---,---.

Signed and Sealed this

Thirteenth Day of September 1977

[SEAL]

Attest:

RUTH C. MASON
Attesting Officer

LUTRELLE F. PARKER
Acting Commissioner of Patents and Trademarks